United States Patent
Urbach

[19]

[11] Patent Number: 5,931,597
[45] Date of Patent: Aug. 3, 1999

[54] BALL JOINT

[75] Inventor: Brian A. Urbach, Rochester Hills, Mich.

[73] Assignee: TRW Inc., Lyndhurst, Ohio

[21] Appl. No.: 08/951,529

[22] Filed: Oct. 16, 1997

[51] Int. Cl.[6] .................................................. F16C 11/00
[52] U.S. Cl. ........................ 403/134; 403/122; 403/131; 403/132
[58] Field of Search .............................. 403/76, 122, 128, 403/131, 132, 134, 135, 140; 277/554, 551, 572

[56] References Cited

U.S. PATENT DOCUMENTS

| | | | |
|---|---|---|---|
| 2,066,695 | 1/1937 | Peo .......................................... | 403/135 |
| 2,932,534 | 4/1960 | Williams ................................. | 403/140 |
| 3,099,879 | 8/1963 | Horovitz ................................. | 403/140 |
| 3,525,448 | 8/1970 | Bauer ........................................ | 403/76 |
| 3,536,346 | 10/1970 | Ulderup .................................. | 403/140 |
| 3,711,121 | 1/1973 | Molby ..................................... | 403/140 |
| 4,034,996 | 7/1977 | Manita et al. .......................... | 403/140 |
| 4,158,511 | 6/1979 | Herbenar . | |
| 4,662,772 | 5/1987 | Schultz ................................... | 403/128 |
| 4,714,270 | 12/1987 | Rumpel .................................. | 480/690 |
| 4,714,368 | 12/1987 | Swada et al. ........................... | 403/132 |
| 5,066,159 | 11/1991 | Urbach . | |
| 5,122,011 | 6/1992 | Missig . | |
| 5,380,114 | 1/1995 | Urbach . | |

FOREIGN PATENT DOCUMENTS

| | | |
|---|---|---|
| 3824271 | 3/1990 | Germany . |
| 1126115 | 5/1989 | Japan . |

*Primary Examiner*—Brian K. Green
*Assistant Examiner*—Marow Dolce
*Attorney, Agent, or Firm*—Tarolli, Sundheim, Covell, Tummino & Szato

[57] ABSTRACT

A ball joint (10) for interconnection between relatively movable parts (12, 14/16) includes a ball stud (70) having a central ball portion (24) and a pair of stud portions (40, 42) extending in diametrically opposite directions from the central ball portion. The stud portions (40, 42) and the central ball portion (24) have a central passage (54) extending axially through the stud portions and the central ball portion. A fastener (260) extends through the central passage (54) for attaching the ball stud (20) to the movable parts (12, 14/16). A housing (60) encloses the central ball portion (24) and has opposite openings (74, 88) through which the respective stud portions (40, 42) extend. First and second bearings (100 and 130) for the central ball portion (24) support the central ball portion in the housing (60) for movement relative to the housing. First and second seals (170 and 200) close the opposite openings (74, 88) in the housing (60). The first and second seals (170 and 200) have first sealing surfaces (186, 216) engaging the housing (60) around the respective opposite openings (74, 88) and second sealing surfaces (178 and 208) engaging the respective stud portions (40, 42) around the stud portions.

1 Claim, 3 Drawing Sheets

BALL JOINT

FIELD OF THE INVENTION

The present invention relates to a ball joint for a motor vehicle steering or suspension system.

BACKGROUND OF THE INVENTION

Ball joints provide an articulated connection between two relatively movable parts. Ball joints are commonly used in motor vehicle steering systems and in motor vehicle suspension systems.

One typical ball joint comprises a ball stud with a spherical ball end and a socket member with a spherical socket. A bearing member in the socket receives the ball end and supports the ball end for rotational and pivotal movement. The ball joint is usually lubricated with grease to provide low friction relative movement of the ball end and the socket member. One or more seals are then secured to the exterior of the ball joint to retain the grease within the joint and to prevent entry of contaminants, such as dirt, that might damage the joint.

SUMMARY OF THE INVENTION

The present invention is a ball joint for interconnection between relatively movable first and second parts. The ball joint comprises a ball stud having a central ball portion and a pair of stud portions extending in diametrically opposite directions from the central ball portion. The stud portions and the central ball portion have a central passage centered on a central axis of the ball stud and extending axially through the stud portions and the central ball portion. A fastener extends through the central passage for attaching the ball stud to at least one of the first and second parts.

A housing encloses the central ball portion and has opposite openings through which the respective stud portions extend. First and second bearings for the central ball portion support the central ball portion in the housing for movement relative to the housing. First and second seals close the opposite openings in the housing. The first and second seals have first sealing surfaces engaging the housing around the respective opposite openings and second sealing surfaces engaging the respective stud portions around the stud portions.

The first seal has a spring ring biasing the second sealing surface against the stud portion. The spring ring is molded into the material of the first seal. The first seal further has a metal ring. The sealing material of the first seal surrounds the metal ring. The housing has a portion clamping against the sealing material of the first seal overlying the metal ring and forcing the metal ring axially toward the first bearing.

BRIEF DESCRIPTION OF THE DRAWINGS

Further features of the present invention will become apparent to those skilled in the art to which the present invention relates from reading the following description with reference to the accompanying drawings, in which.

DESCRIPTION OF A PREFERRED EMBODIMENT

Figure 1:
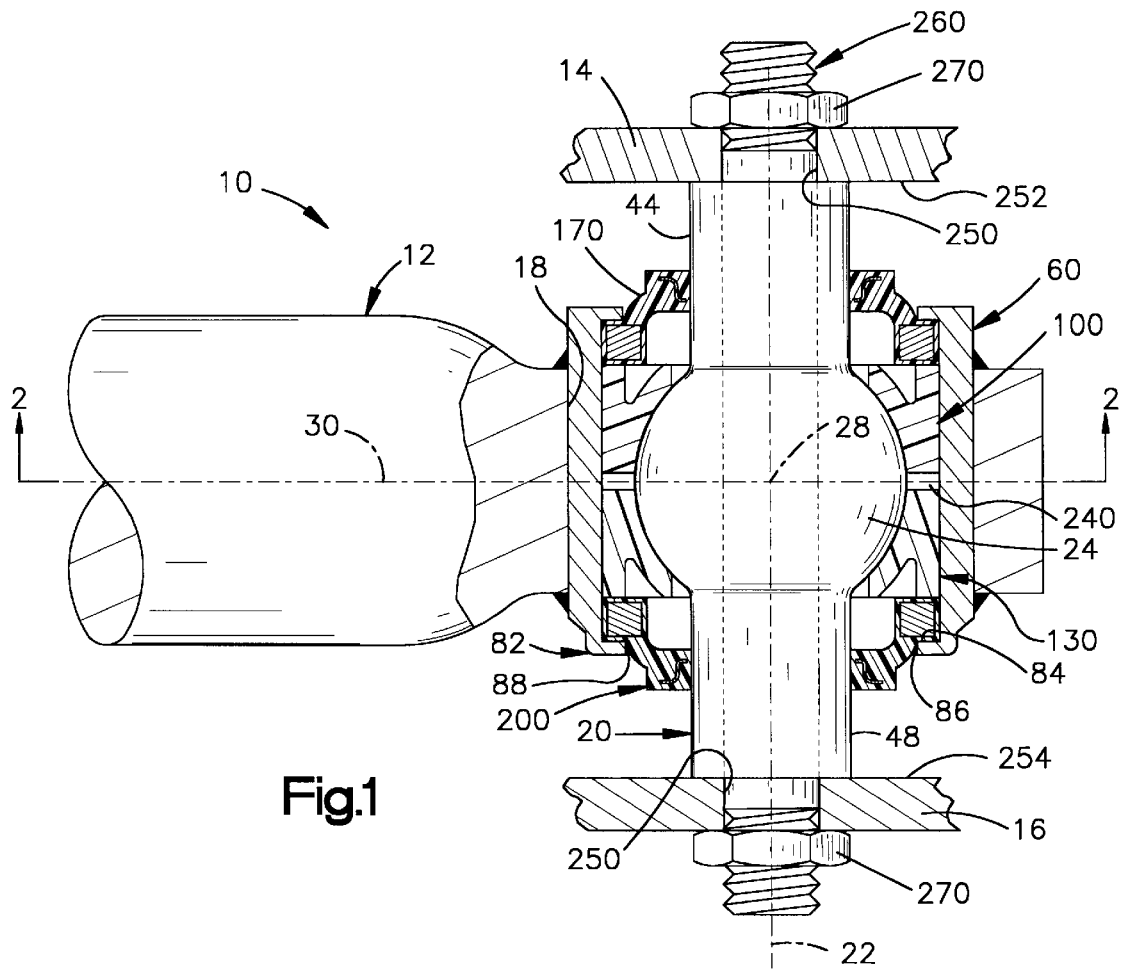
FIG. 1 is a sectional view illustrating a ball joint constructed in accordance with the present invention.
Figure 3:
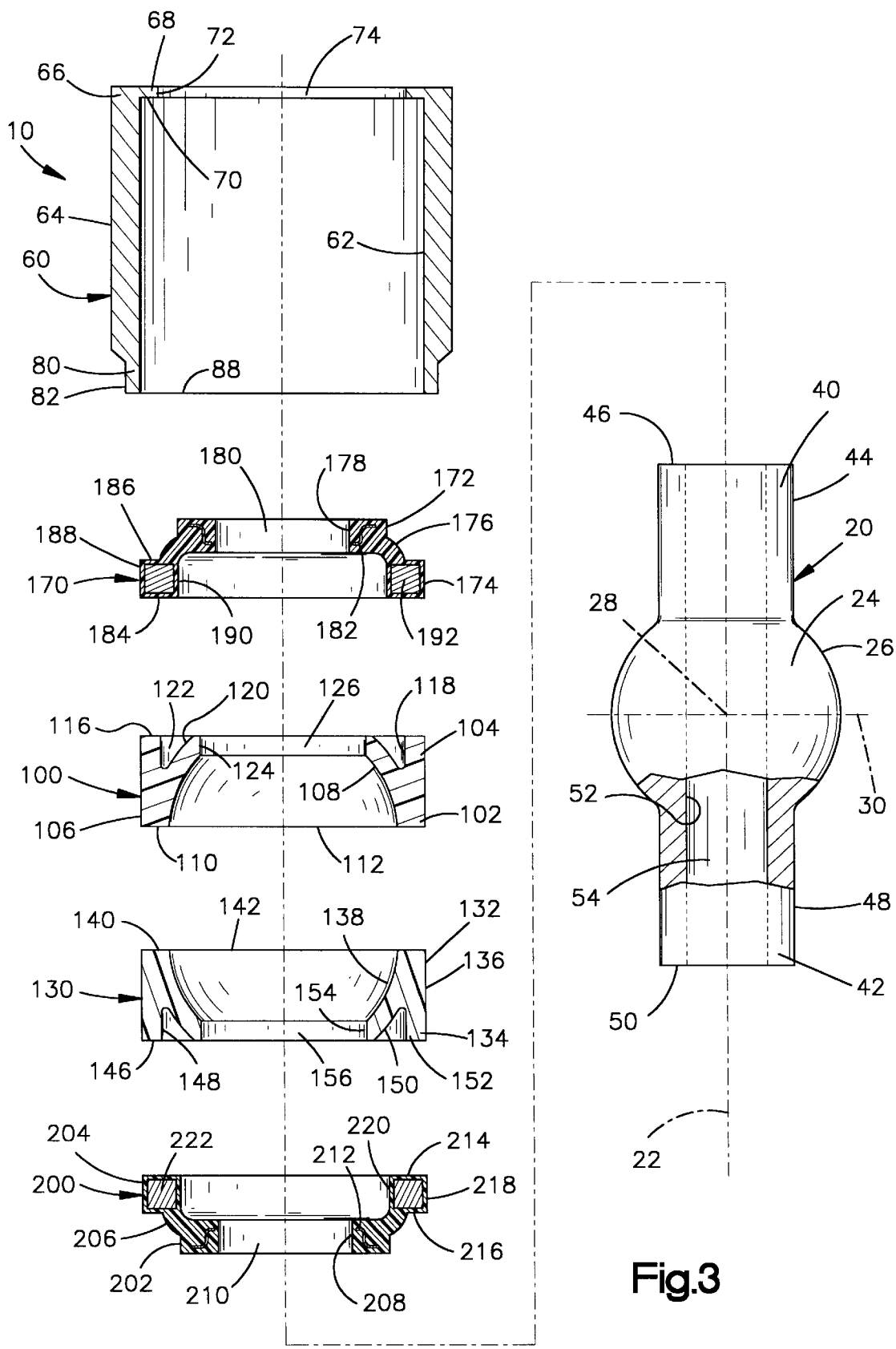
FIG. 3 is an exploded view, partially in section, of parts of the ball joint shown in FIG. 1.

A ball joint 10 constructed in accordance with the present invention is illustrated in FIG. 1. The ball joint 10 interconnects relatively movable parts, such as a suspension link 12 and parallel flanges 14 and 16 of the vehicle frame. The ball joint 10 includes a metal ball stud 20 which is centered on an axis 22. The ball stud 20 includes a central ball portion 24 (FIG. 3). The central ball portion 24 has a substantially spherical outer surface 26 centered on a pivot center 28. The central ball portion 24 has a centerline 30 which extends perpendicular to the axis 22. The pivot center 28 is located on the axis 22 at the intersection of the axis and the centerline 30.

The ball stud 20 includes first and second stud portions 40 and 42 which extend from the central ball portion 24 in diametrically opposite directions. The first and second stud portions 40 and 42 are centered on the axis 22. The first stud portion 40 has a cylindrical outer surface 44 and a planar end surface 46 which is perpendicular to the axis 22. The second stud portion 42 has a cylindrical outer surface 48 and a planar end surface 50 which is perpendicular to the axis 22.

The ball stud 20 includes a cylindrical inner surface 52 which defines a central passage 54 through the ball stud. The central passage 54 is centered on the axis 22. The central passage 54 extends from the planar end surface 46 of the first stud portion 40 of the ball stud 20 through the central ball portion 24 to the planar end surface 50 of the second stud portion 42.

The ball joint 10 further includes a rigid metal housing 60 which is centered on the axis 22. The housing 60 has parallel, cylindrical inner and outer side surfaces 62 and 64, respectively. A first end portion 66 of the housing 60 includes a radially inwardly extending flange 68. The flange 68 has a radially extending first surface 70 and an axially extending second surface 72. The second surface 72 in the first end portion 66 of the housing 60 defines a first opening 74 in the housing.

A second end portion 80 of the housing 60 includes a crimpable flange 82 which has a crimped position and an uncrimped position. The crimpable flange 82 extends axially in its uncrimped position shown in FIG. 2. In its crimped position shown in FIG. 1, the flange 82 has a first surface portion 84 which extends generally radially inward and a second surface portion 86 which extends generally axially. In the crimped position, the second surface portion 86 of the flange 82 in the second end portion 80 of the housing 60 defines a second opening 88 (FIG. 1) in the housing.

The ball joint 10 includes first and second bearings 100 and 130 for supporting the central ball portion 24 of the ball stud 20 in the housing 60 for movement relative to the housing. The bearings 100 and 130 are made of any suitable material, but preferably are made of injection molded Delrin brand plastic which is available from E. I. DuPont de Nemours & Co. The first and second bearings 100 and 130 are annular and are centered on the axis 22.

The first bearing 100 has first and second end portions 102 and 104 (FIG. 3). A cylindrical outer surface 106 and a generally semi-spherical inner surface 108 extend between the end portions 102 and 104 of the first bearing 100. The first end portion 102 has a first surface 110 which extends radially from the inner surface 108 of the first bearing 100 to the outer surface 106. A first opening 112 in the first bearing 100 is defined by the intersection of the first surface 110 and the inner surface 108.

The second end portion 104 of the first bearing 100 has a second surface 116 which extends radially inward from the outer surface 106 to a third surface 118 which extends axially and is parallel to the outer surface 106. A fourth surface 120 in the second end portion 104 extends arcuately with approximately the same curvature as the inner surface 108 and intersects the third surface 118 to form a generally V-shaped annular groove 122 in the second end portion of the first bearing 100. The V-shaped groove 122 in the bearing 100 serves as a reservoir for a lubricant, such as grease, for the ball joint 10.

A fifth surface 124 extends axially between the fourth surface 120 and the inner surface 108 of the first bearing 108. The fifth surface 124 defines a second opening 126 in the first bearing 100. The diameter of the second opening 126 in the second end portion 104 of the first bearing 102 is smaller than the diameter of the first opening 112 in the first end portion 102 of the first bearing.

The second bearing 130 is identical in construction to the first bearing 100. The second bearing 130 has first and second end portions 132 and 134. A cylindrical outer surface 136 and a generally semi-spherical inner surface 138 extend between the end portions 132 and 134 of the second bearing 130. The first end portion 132 has a first surface 140 which extends radially from the inner surface 138 of the second bearing 130 to the outer surface 136. A first opening 142 in the second bearing 130 is defined by the intersection of the first surface 140 and the inner surface 138.

The second end portion 134 of the second bearing 130 has a second surface 146 which extends radially inward from the outer surface 136 to a third surface 148 which extends axially and is parallel to the outer surface 136. A fourth surface 150 in the second end portion 134 extends arcuately with approximately the same curvature as the inner surface 138 and intersects the third surface 148 to form a generally V-shaped annular groove 152 in the second end portion of the second bearing. The V-shaped groove 152 in the bearing 130 serves as a reservoir for grease for lubricating the ball joint 10.

A fifth surface 154 extends axially between the fourth surface 150 and the inner surface 138 of the second bearing 130. The fifth surface 154 defines a second opening 156 in the second bearing 130.

The ball joint 10 includes first and second seals 170 and 200 for closing and sealing the first and second openings 74 and 88, respectively, in the housing 60. The first and second seals 170 and 200 are annular and are centered on the axis 22. The seals 170 and 200 are preferably made of a suitable elastomeric material, but made be made of other suitable materials known in the art.

Figure 4:
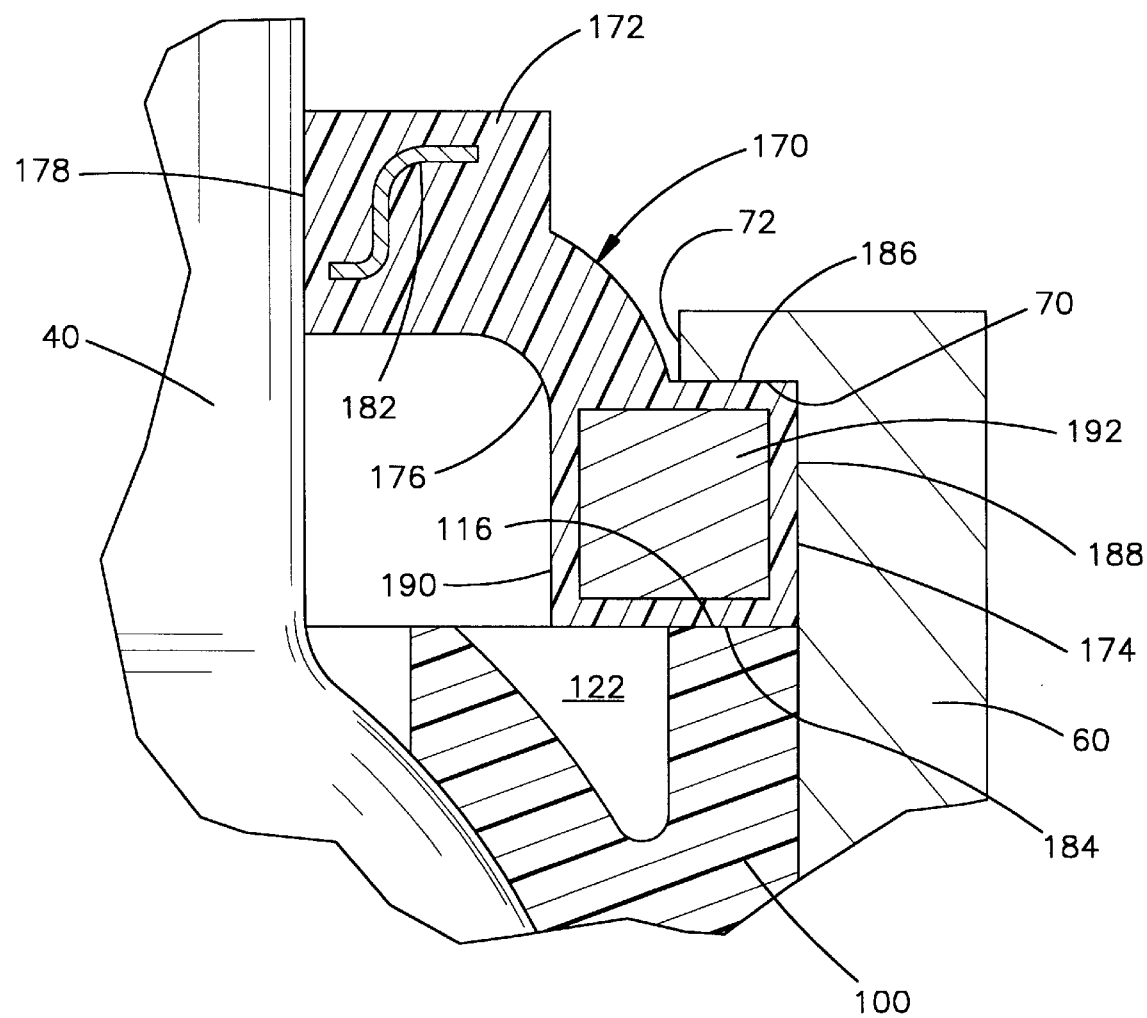
FIG. 4 is an enlarged view of a portion of the ball joint shown in FIG. 1.

The first seal 170 includes a stud seal portion 172 and a bearing seal portion 174 which are connected by a connector portion 176 (FIGS. 3 and 4). The stud seal portion 172 includes an axially extending surface 178 which defines a passage 180 for receiving the first stud portion 40 of the ball stud 30. An S-shaped spring ring 182 is injection molded in the stud seal portion 172 of the first seal 170 and is embedded in the stud seal portion 172. The spring ring 182 exerts a radially inward biasing force on the stud seal portion 172 of the first seal 170.

The bearing seal portion 174 includes first and second surfaces 184 and 186 which extend radially and third and fourth surfaces 188 and 190 which extend axially. The connector portion 174 of the first seal 170 connects with the second surface 186 of the bearing seal portion 174.

An annular metal retaining ring 192 is injection molded in the bearing seal portion 174 of the first seal 170. The retaining ring 192 is generally square in cross-section and is surrounded on all four sides by the elastomeric material of the bearing seal portion 174.

The second seal 200 is identical in construction to the first seal 170. The second seal thus includes a stud seal portion 202 and a bearing seal portion 204 which are connected by a connector portion 206. The stud seal portion 202 includes an axially extending surface 208 which defines a passage 210 for receiving the second stud portion 42 of the ball stud 20. An S-shaped spring ring 212 is injection molded in the stud seal portion 202 of the second seal 200 and is embedded in the stud seal portion 202. The spring ring 212 exerts a radially inward biasing force on the stud seal portion 202 of the second seal 200.

The bearing seal portion 204 includes first and second surfaces 214 and 216 which extend radially and third and fourth surfaces 218 and 220 which extend axially. The connector portion 206 of the second seal 200 connects with the second surface 216 of the bearing seal portion 204.

An annular metal retaining ring 222 is injection molded in the bearing seal portion 204 of the second seal 200. The retaining ring 222 is generally square in cross-section and is surrounded on all four sides by the elastomeric material of the bearing seal portion 204 of the second seal 200.

Figure 2:
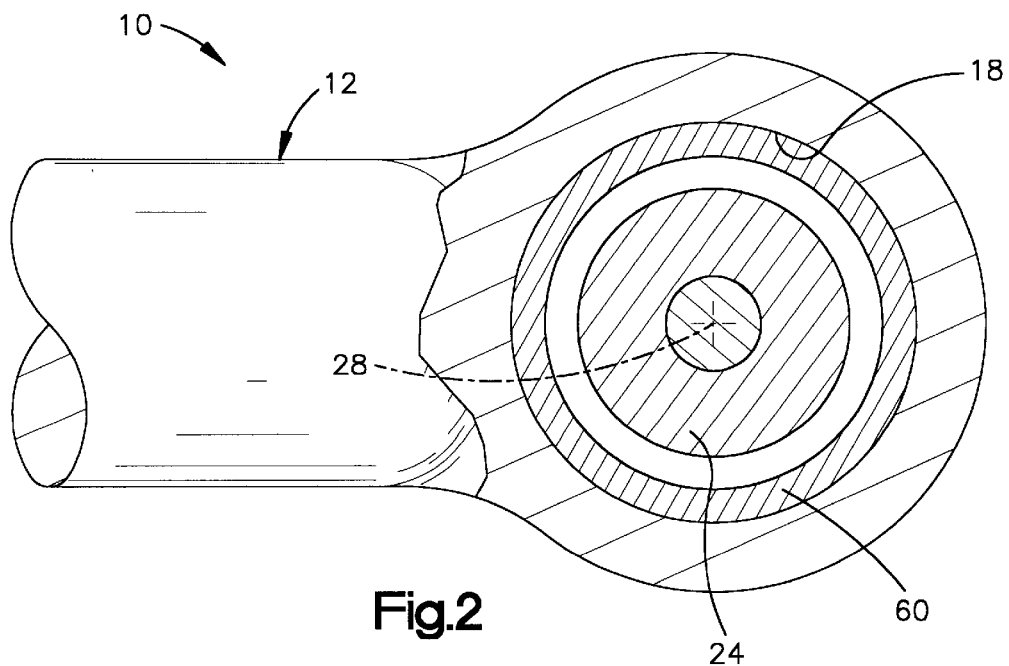
FIG. 2 is a view taken approximately along line 2—2 in FIG. 1.

In the assembled and installed condition of the ball joint 10, the housing 60 in the ball joint is attached to the suspension link 12 (FIGS. 1 and 2). The suspension link 12 includes an opening defined by a cylindrical surface 18 for closely receiving the cylindrical outer surface 64 of the housing 60. The housing 60 is fixedly secured to the link by press-fitting and/or welding the housing in the opening in the link 12. The housing 60 may be secured to the link 12 prior to assembly of the components of the ball joint 10 or as part of a complete ball joint assembly.

The first seal 170 is located adjacent the first end portion 66 of the housing 60. The stud seal portion 172 of the first seal 170 protrudes through the first opening 74 in the first end portion 66 of the housing 60. The second surface 186 of the bearing seal portion 174 of the first seal 170 abuts the first surface 70 of the radially extending flange 68 on the housing 60. The third surface 188 of the bearing seal portion 174 adjoins the cylindrical inner surface 62 of the housing 60.

The first bearing 100 is located adjacent the first seal 170 in the ball joint 10. The second surface 116 in the second end portion 104 of the first bearing 100 abuts the first surface 184 in the bearing seal portion 174 of the first seal 170. The cylindrical outer surface 106 of the first bearing 100 is closely received by the cylindrical inner surface 62 of the housing 60. The first surface 110 in the first end portion 102 of the first bearing 100 faces toward the second opening 88 in the housing 60.

The second seal 200 is located adjacent the second end portion 80 of the housing 60. The stud seal portion 202 of the second seal 200 protrudes through the second opening 88 in the second end portion 80 of the housing 60. The second surface 216 of the bearing seal portion 204 of the second seal 200 abuts the first surface portion 84 of the crimpable flange 82 on the housing 60. The third surface 218 of the bearing seal portion 204 adjoins the cylindrical inner surface 62 of the housing 60.

The second bearing 130 is located adjacent the second seal 200 in the ball joint 10. The second surface 146 in the second end portion 134 of the second bearing 130 abuts the first surface 214 in the bearing seal portion 204 of the second seal 200. The cylindrical outer surface 136 of the second bearing 130 is closely received by the cylindrical inner surface 62 of the housing 60. The first surface 140 in the first end portion 132 of the second bearing 130 faces toward, but does not engage, the first surface 110 in the first end portion 102 of the first bearing 100 in the ball joint 10. Thus, an annular space 240 (FIG. 1) is defined between the facing first surfaces 110 and 140 of the first and second bearings 100 and 130, respectively. The space 240 serves as a reservoir for grease and also as a means for absorbing stack-up of tolerances in the ball joint 10.

The first and second bearings 100 and 130 together provide a means for supporting the ball stud 20 for movement relative to the bearings and to the housing 60. A portion of the spherical outer surface 26 of the central ball portion 24 rests against and is supported by the inner surface 108 of the first bearing 100. Another portion of the outer surface 26 of the central ball portion 24 rests against and is supported by the inner surface 138 of the second bearing 130.

The first stud portion 40 of the ball stud 20 extends through the passage 180 in the stud seal portion 172 of the first seal 170. The axially extending surface 178 in the stud seal portion 172 sealingly engages the cylindrical outer surface 44 of the first stud portion 40.

The second stud portion 42 of the ball stud 20 extends through the passage 210 in the stud seal portion 202 of the second seal 200. The axially extending surface 208 sealingly engages the cylindrical outer surface 48 of the second stud portion 42.

To complete the interconnection of the link 12 and the flanges 14 and 16 using the ball joint 10, the ball stud 20 is located between the flanges so that the central passage 54 in the ball stud aligns with an opening 250 in each of the flanges. The end surface 46 of the first stud portion 40 abuts an inwardly facing surface 252 on the flange 14. The end surface 50 of the second stud portion 42 abuts an inwardly facing surface 254 on the flange 16. A fastener 260, such as a threaded rod, is inserted through the openings 250 in the flanges 14 and 16 and extends through the central passage 54 in the ball stud 20. Nuts 270 screwed on the threaded ends of the fastener 260 secure the ball stud 20 to the flanges 14 and 16.

In the assembled condition shown in FIG. 1, the ball joint 10 permits relative rotational and/or pivotal movement between the link 12 and the flanges 14 and 16. For example, the ball joint 10 permits the link 12 to rotate about the axis 22 of the ball stud 20. Further, the ball joint 10 permits the link 12 and the flanges 14 and 16 to oscillate relative to each other about the pivot center 28 of the ball stud 20.

The S-shaped spring ring 182 in the first seal 170 provides sufficient radial biasing to maintain a seal against the first stud portion 40 of the ball stud 30 while still allowing the stud portion to rotate about the axis 22. Similarly, the S-shaped spring ring 212 in the second seal 200 provides sufficient radial biasing to maintain a seal against the second stud portion 42 while still allowing the stud portion to rotate about the axis 22.

The metal rings 192 and 222 in the first and second seals 170 and 200, respectively, provide a rigid body between the housing flanges 66 and 82 and the bearings 100 and 130, which allows the bearings to be pre-loaded (or forced) axially in the ball joint 10. Further, the metal rings 192 and 222 in the seals 170 and 200, respectively, resist externally applied axial loads which tend to pull the joint 10 apart by transferring the loads to the housing 60. For example, an axial load on the ball stud 20 which is transferred to the first bearing 100 is subsequently transferred via the abutting surfaces 116 and 184 to the bearing end portion 174 of the first seal 170. The load is then transferred through the abutting surfaces 186 and 70 to the housing 60.

From the above description of the invention, those skilled in the art will perceive improvements, changes and modifications. Such improvements, changes and modifications within the skill of the art are intended to be covered by the appended claims.

Having described the invention, I claim:

1. Apparatus comprising:

first and second spaced apart parts of a vehicle frame;

a ball stud having a central ball portion and a pair of stud portions extending in diametrically opposite directions from said central ball portion, said stud portions and said central ball portion having a central passage centered on a central axis of said ball stud and extending axially through said stud portions and said central ball portion;

a fastener extending through said central passage for attaching said ball stud to said first and second parts;

a housing enclosing said central ball portion and having opposite openings through which said stud portions extend;

a vehicle suspension link fixedly attached to said housing;

first and second spaced apart bearings for said central ball portion located on opposite sides of said central ball portion and supporting said central ball portion in said housing for rotational and oscillatory movement relative to said housing; and first and second seals for sealing said opposite openings in said housing, said first and second seals each having first sealing surfaces sealingly engaging against said housing around said opposite openings and second sealing surfaces sealingly engaging against said stud portions around said stud portions;

said first and second seals each having a spring ring biasing said second sealing surfaces against said stud portions;

said first and second seals each comprising sealing material and a metal retaining ring, said metal retaining rings being molded into said sealing material of said first and second seals, said housing having a surface abutting said sealing material of said first and second seals overlying said metal retaining rings and forcing said metal retaining rings axially toward said first and second bearings.

* * * * *